United States Patent [19]

Horstman

[11] Patent Number: 5,263,667
[45] Date of Patent: Nov. 23, 1993

[54] PERFORATED WING PANEL WITH VARIABLE POROSITY

[75] Inventor: Raymond H. Horstman, Auburn, Wash.

[73] Assignee: The Boeing Company, Seattle, Wash.

[21] Appl. No.: 756,402

[22] Filed: Sep. 9, 1991

[51] Int. Cl.$^5$ .............................................. B64C 21/06
[52] U.S. Cl. ...................................... 244/209; 244/130
[58] Field of Search ................. 244/204, 208, 209, 130

[56] References Cited

U.S. PATENT DOCUMENTS

| | | |
|---|---|---|
| 2,742,247 | 4/1956 | Lachmann . |
| 2,751,168 | 6/1956 | Stalker ................ 244/209 |
| 2,843,341 | 7/1958 | Dannenberg et al. . |
| 3,097,817 | 7/1963 | Towzey . |
| 3,951,360 | 4/1976 | Anxionnaz ............ 244/209 |
| 4,434,201 | 2/1984 | Humphreys ........... 244/134 C |
| 4,522,360 | 6/1985 | Barnwell . |
| 4,575,030 | 3/1986 | Gratzer . |
| 4,619,423 | 10/1986 | Holmes et al. ........ 244/130 |
| 4,666,104 | 5/1987 | Kelber . |
| 4,932,612 | 6/1990 | Blackwelder et al. . |
| 4,986,496 | 1/1991 | Marentic et al. ...... 244/130 |

OTHER PUBLICATIONS

Wagner, R. D., et al., "Fifty Years of Laminar Flight Testing," *Aeronautic and Technical Conference and Exposition*, Oct. 1988.
Browne, Malcolm W., "New Plane Wing Design Greatly Cuts Drag to Save Fuel," *New York Times*, Sep. 1990.
*Flight* International, "Laminar Flow a Reality", May 15, 1982.
NASA Facts, NF86/8-79, "Laminar Flow Control Tech".
Stambler, "Laminar Flow Control Wears Full Scale Flight Test", pp. 60-64 Space/Aeronautics, Oct. 1962.
Wilkinson, "Influence of Wall Permability on Turbulent Boundary Layer Prop.", AIAA Paper 83-0294, Jan. 1983.
NACA TN 3094, Dannenberg et al, Jan. 1954.

*Primary Examiner*—Galen Barefoot
*Attorney, Agent, or Firm*—Townsend and Townsend

[57] ABSTRACT

The present invention involves laminar flow control for reducing drag on a body moving through a fluid. A skin is provided through which fluid in the boundary layer is drawn. The skin includes a plurality of perforations. The ratio of the effective area of the perforations to the skin area is spatially variable. The ratio is varied to compensate for expected variations in external pressure such that a substantially uniform suction results in a spatially uniform mass flow rate through the skin. Preferably, the perforations are approximately tapered to avoid inspiration of debris and unwanted outflow.

22 Claims, 6 Drawing Sheets

PERFORATED WING PANEL WITH VARIABLE POROSITY

The U.S. Government may have certain rights to practice this invention pursuant to development support provided by the National Aeronautics and Space Administration.

The present application relates to a perforated surface such as a wing panel of an aircraft with a spatially variable distribution of effective perforation area and, in particular, to a perforated panel for use in laminar flow control, such as in an aircraft surface.

BACKGROUND OF THE INVENTION

It is known that drag created on a body moving through fluid, such as an aircraft moving through air, can be reduced by delaying (i.e., moving leeward or aft with respect to the body) the region on the body where the fluid flow undergoes transition from laminar to turbulent flow. Early attempts to reduce drag involved natural laminar flow (NLF), generally involving efforts to produce airfoil surfaces with extremely low surface roughness. NLF approaches have suffered from the difficulty of manufacturing such low-roughness devices as well as contamination of surfaces by impact, debris, insects, etc.

A second general approach to delaying turbulence involves laminar flow control (LFC) in which boundary layer air from the free stream is drawn through the surface of the body into the interior. In this application, the mass rate of flow across the surface of the body must remain within a desired range. Either too low a flow rate or too high a flow rate can frustrate the goal of delaying the turbulent transition point or even result in an increase in drag. In a typical LFC application, air is drawn through the wing surface of an aircraft by a suction system. This approach, in the past, proved difficult to implement. In order to provide the desired delay of laminar-to-turbulent transition, the boundary layer air must be drawn in with as uniform a distribution as possible. The flow rate through the surface, however, is largely determined (other factors being equal) by the air pressure on the external surface of the body. In many surfaces of interest, such as the wing surface of an aircraft, the external pressure may vary significantly over the surface, causing locally excessive flow where pressures are high and excessively low flow (or even outflow) where pressures are low. External pressure distribution may be particularly variable over the surface in cases where an engine is mounted on the o wing, due to the flow disturbance of the nacelle and strut.

In order to draw fluid through the surface of the body, three main approaches have been attempted in the past: surface slots, porous surface materials, and perforated surfaces. Previous work using each of these approaches has encountered difficulties. Slots present structural problems since it is difficult to transmit shear in the skin of a wing or body which is interrupted by continuous slots. Slots also present difficult fabrication problems. In particular, it has been difficult to provide slots such that the two edges of the slot remain parallel and smooth, particularly when the slots require reinforcement to overcome the structural difficulties.

Porous skin materials also present structural problems since they typically are not capable of withstanding high stresses. Further, porous materials typically have an unacceptably high surface roughness and are prone to permitting outflow of air through the surface in response to local low pressure. Since porous material contains channels that are natural, (i.e., inherent to the material) rather than fabricated under controlled conditions, it is difficult to obtain material with consistent porosity and difficult to predict or model the flow through the porous material (since the exact porous structure may not be known).

Perforated surfaces (substantially non-porous material in which openings have been fabricated) can avoid some of the problems regarding predictability found in porous materials. However, the perforations in many previous perforated materials occupied so much of the area of the material (e.g., more than 10%) that the material was weakened and reinforcement was provided to compensate for the weakening. Many previous perforated materials had perforations that were sufficiently large and spaced sufficiently far apart that a large aerodynamic roughness resulted when fluid was drawn through the perforations. The apparent roughness presented to the flow over the surface is affected by the presence of stream tubes extending above the surface. When these stream tubes are spaced relatively far apart, and accommodate a relatively large flow, the apparent roughness is relatively large. Perforated materials are also subject to blockage from inspiration of debris or from icing. Inspiration of debris is a greater problem for perforations that have larger openings at the external surface. Relatively large perforations also make it difficult to obtain sufficient pressure drop to maintain the desired suction.

Many previous perforated surfaces used in connection with laminar flow control provided perforations which were of equal diameter and equal spatial distribution throughout the perforated region. If this configuration is to be used in an application where external air pressure is non-uniform over the surface, some procedure must be used to achieve uniform mass flow despite the pressure variations. One approach is to provide a suction system which delivers different amounts of suction to different portions of the surface. While this approach can be used to provide a few regions of different suction, the variety and the distribution of external pressure in a practical application such as an aircraft wing generates complex problems in controlling the suction when suction control is the sole means of controlling flow. Another approach is described in U.S. Pat. No. 2,843,341 in which uniformly perforated plates are used in series with a porous material. This approach, however, suffers from many of the disadvantages noted above of porous materials in general. In the context of a system which provides a porous material and a perforated material in series, it has been suggested that the number and diameters of the perforations, can be varied, e.g., in U.S. Pat. No. 2,742,247. However, use of such a perforated material in series with a porous material presents the problems noted above of porous materials in general.

SUMMARY OF THE INVENTION

The present invention includes the recognition of the problems present in previous devices, including those noted above. According to the present invention, a surface system is provided which includes a perforated material in which the portion of the surface area effectively occupied by perforation, is spatially variable.

According to an embodiment of the invention, a laminar flow control airfoil is subjected, during flight, to external pressure such that there is at least one region of the airfoil with a higher external pressure than a second region. The airfoil includes a skin with an upper surface and a lower surface. A plurality of perforations are formed through the skin, each having an effective cross-sectional area. Thus, there is, for any region of the skin which includes at least one perforation, an average ratio of effective perforation cross-sectional area to total skin area. A suction system is connected to the lower surface of the skin. The suction system draws air through the perforations in a direction from the upper surface toward the lower surface. The ratio of perforation area to skin area is spatially variable over at least part of the perforated skin.

In one embodiment, the perforated material is not used in series with a porous material so that air is drawn through the perforated material without passing through porous material before it enters the suction system. In one embodiment of the invention, there is at least one portion of the surface which has a spatially variable density of perforation area and another area in which the portion of the surface occupied by perforations is substantially spatially uniform. In one embodiment of the invention, the perforations have a substantially tapered shape with a larger diameter near the lower surface of the skin than near the upper surface of the skin.

DESCRIPTION OF THE PREFERRED EMBODIMENT

Figure 1:
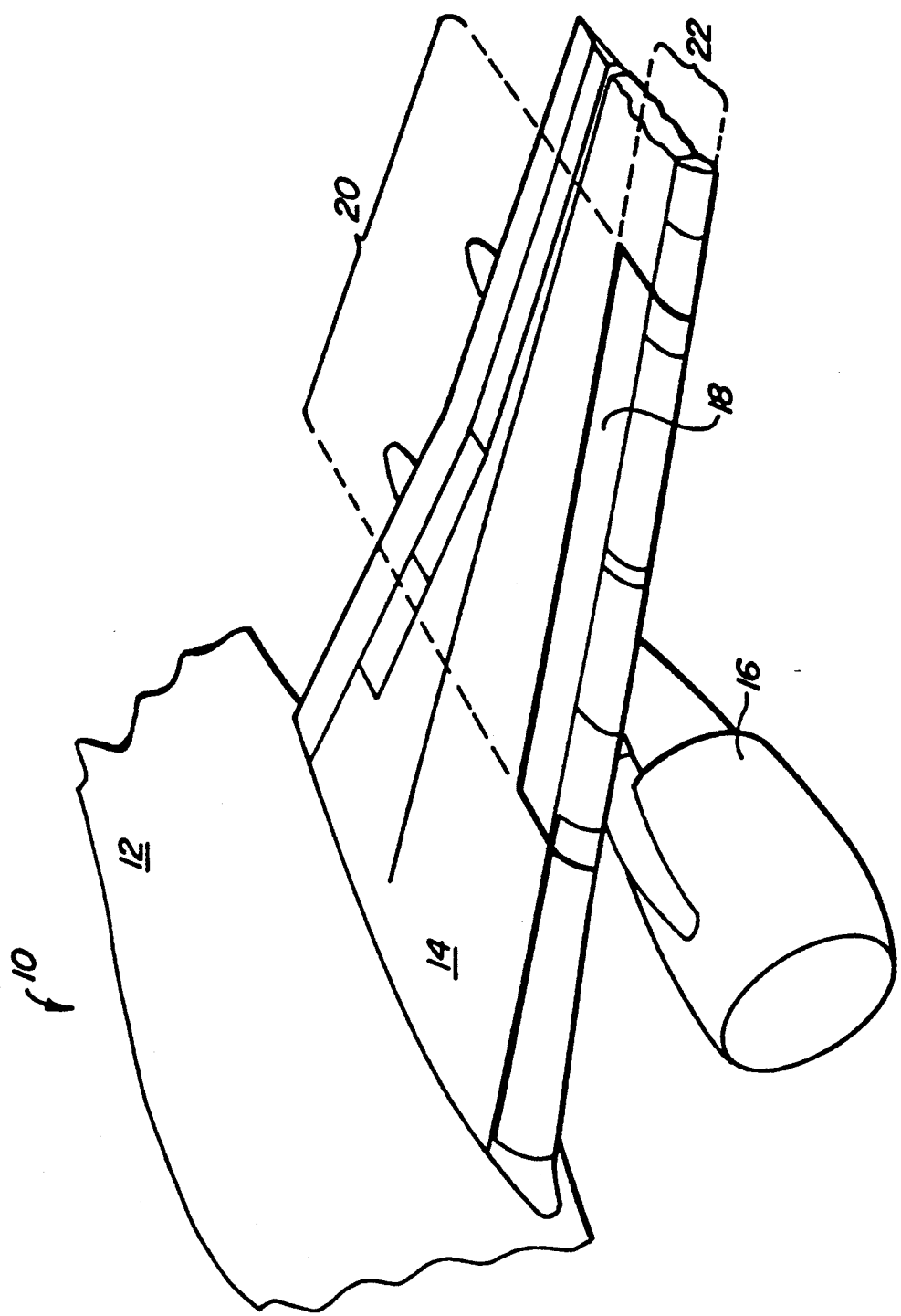
FIG. 1 is a perspective, partially broken-away view of an aircraft wing and fuselage according to the present invention.

FIG. 1 depicts an application of the present invention to an aircraft 10 which includes a fuselage 12 and a wing 14. In the depicted aircraft, an engine 16 is attached to the wing 14. An external surface apparatus for laminar flow control (LFC) 18 is positioned on an exterior surface of the wing 14. In the depicted embodiment, the LFC apparatus 18 is positioned along the upper surface and leading edge of a portion of the wing 14. The LFC apparatus 18 has a spanwise extent 20 and a chordwise extent 22.

Figure 2:
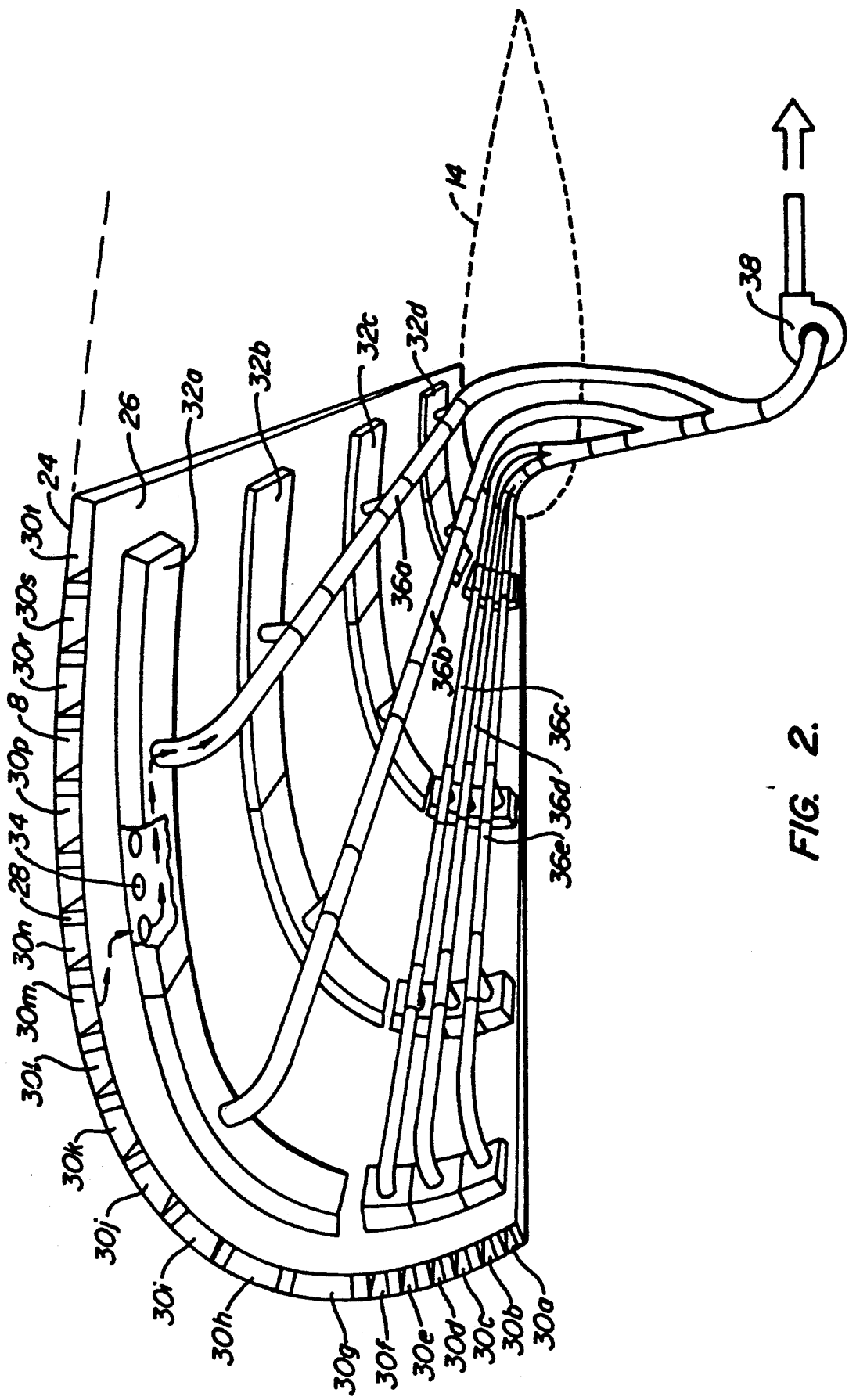
FIG. 2 is a perspective, partially broken-away view of the underside of a portion of the top surface of an aircraft wing.

As seen in FIG. 2, the upper surface of the wing 14 is made up of an outer skin 24 and an inner skin 26 attached to a plurality of stringers 28. The stringers 28, upper skin 24 and lower skin 26 define a plurality of flutes 30a–30t. The upper skin 24 includes a plurality of perforations as described more fully below. A plurality of collectors 32a, 32b, 32c, 32d, in the form of conduits, are attached to the interior surface of the inner skin 26. A plurality of holes 34 through the inner skin 26, aligned with the collectors 32 provide fluid communication between the flutes 30 and the collectors 32. The collectors 32, in turn, are in fluid communication with a plurality of collection tubes 36a, 36b, 36c, 36d, 36e which lead to a pump 38. The flutes 30, collectors 32, and conduits 36 collectively form a plenum which can be maintained at a reduced pressure, as described below, by the pump 38. Fluid output by the pump 38 is vented to the atmosphere by an exhaust system (not shown). The walls of the plenum 30, 32, 36 can be formed of a variety of materials and are preferably formed of an aluminum alloy, except for the outer skin 24 which preferably has at least a portion comprising titanium, as described more fully below.

Figure 3:
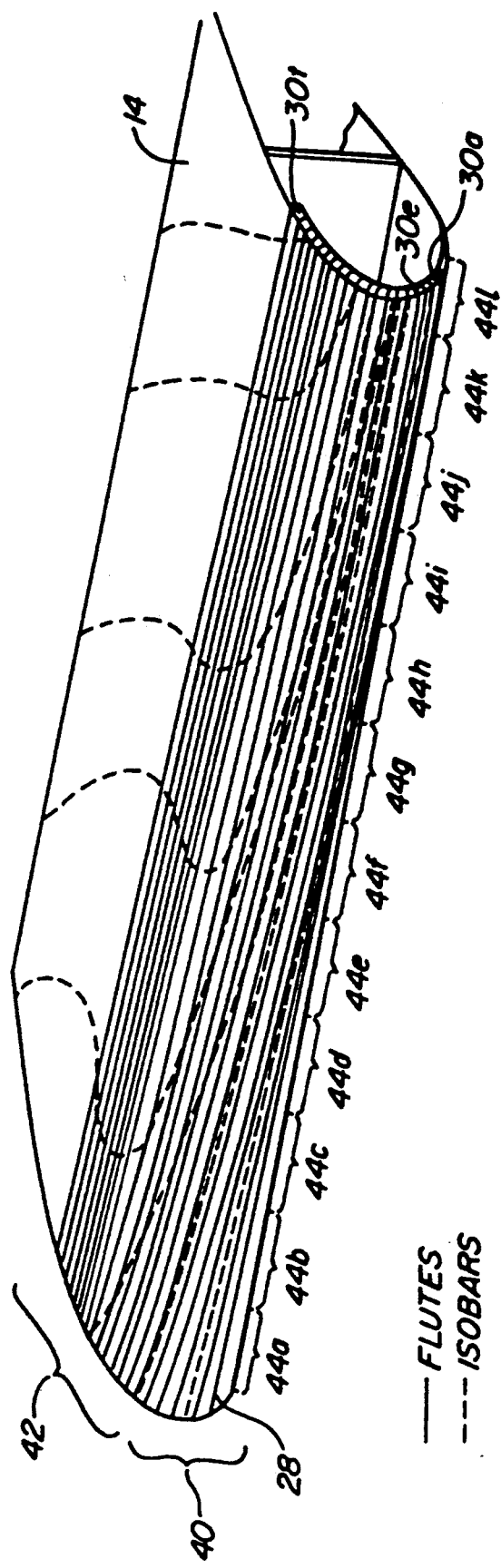
FIG. 3 is a partial perspective view of an aircraft wing showing lines of constant pressure (isobars) and the location of stringers.

During flight, the wing 14 is subjected to external air pressure which is spatially variable as depicted in FIG. 3, in which dotted lines show isobars. Solid lines show the position of the stringers 28. In a first chordwise region 40, the stringers 28 are substantially parallel to the isobars. In the aft region 42, the stringers 28 are not parallel to the isobars. In one embodiment, the LFC apparatus 18, including the perforated portion of the skin 24, extends over approximately the leading 15% of the chordwise extent of the wing 14 and extends over approximately 17 feet (about 5 meters) of the spanwise extent of the wing 14. The perforations in the outer skin 24 are substantially continuously distributed over the area of the wing provided with the LFC apparatus, rather than being provided in discrete and separated areas or rows (although small unperforated regions may occur as an artifact of the fabrication process, as described below). In one embodiment, the total effective cross-sectional area of the perforations represents less than about 8%, preferably less than about 2% and more preferably less than about 1% and even more preferably less than about 0.5% of the total surface area of that portion of the wing surface taken up by the LFC apparatus. Because such a small portion of the surface of the skin 24 is perforated, the skin 24 retains a substantial portion of its strength (compared to unperforated skin) and for this reason, it is not necessary, in this embodiment, to add additional strengthening members (with consequent weight penalties) to compensate for loss of strength.

Each of the perforations through the skin 24 has an effective cross-sectional area. The effective cross-sectional area of a perforation is the cross-sectional area of an ideal cylindrical perforation which produces the same flow rate (in response to the typical pressure differential between the upper and lower surfaces of the skin 24 under cruising conditions with the suction system engaged) as is produced by the actual perforation. The effective diameter of the perforation is the diameter of such an ideal cylindrical perforation. For any perforated region of the skin 24, there is an average ratio of effective perforation area to skin area. For a given region of the perforated skin 24, where the region has an area of $A_r$, the total of the effective cross-sectional areas of all of the perforations in that region can be expressed as $A_p$. In this case, the average ratio of effective perforation area to skin area for this region is $A_p/A_r$. In order for this ratio to be a useful value, $A_r$ should be large enough to include a plurality of perforations and should be large enough to be representative of the local density of perforations in that portion of the skin. The ratio of perforation area to skin area is spatially variable over the LFC apparatus region. The variation is configured to result in a substantially uniform in-flow of fluid through the skin 24 in the region of the LFC apparatus. The variation is such that substantially spatially constant suction on the lower surface of the skin 24 results in substantially spatially uniform mass flow through the skin 24, despite the above-described spatial variability of external fluid pressure on the exterior surface of the skin 24. Although exact uniformity of mass flow is unlikely to be achieved, the present invention provides substantial uniformity of the mass flow, i.e., such that laminar flow control is operative and results in delay or movement of the location of the onset of turbulence aft along the surface of the wing 14. In general, this involves providing more and/or larger perforations in areas where there is a lower external pressure during cruising flight, compared to those areas where there is a relatively higher pressure. In many proposed applications of this invention, it is anticipated that the external pressure will vary in two dimensions, similar to the variations depicted in FIG. 3, and that therefore the variation in the ratio will also occur in two dimensions (with respect to the external surface which may, itself, be curved).

The spatial variation in the ratio can be achieved by varying the number of holes per unit area of surface, the size of the holes, or both. As noted above, holes which are larger, in general, provide an undesirable increase in aerodynamic roughness. This characteristic makes it preferable to use smaller holes. However, providing smaller, numerous holes, is more difficult and expensive than providing larger holes. Thus, the decision provide the desired variation in ratio by changing the number of holes or by changing the size of the holes is a choice which is influenced by several competing factors. Preferably, the holes have a diameter less than about 0.005 inches (0.13 mm), more preferably less than about 0.004 inches (0.1 mm) and even more preferably less than about 0.003 inches (0.08 mm). In one embodiment of the present invention, smaller holes, e.g., holes with an effective diameter of about 0.0016 inches (about 0.04 mm) are used in the leading edge region (the "cross-flow control" region) 40 while the effective diameter of perforations in the area immediately aft (the "Tollmien-Schlichting" or "TS control" region) 42, can range over larger sizes (such as an effective diameter of about 0.0023 inches, about 0.06 mm). Larger effective-diameter perforations are used in the TS control area 42 because, as noted, they are easier to fabricate. Also, aerodynamic roughness in this region is somewhat less undesirable because the boundary layer in this region is thicker than in the cross flow control region 40 and thus a given roughness length is a smaller percentage of the total boundary layer in region 42 than in region 40.

In one embodiment of the invention, the ratio is varied on a region-by-region. In this embodiment, a number of regions are defined as depicted in FIG. 3. Any point on the upper surface of the outer skin 24 can be designated as belonging to 1 of 12 spanwise regions 44a–44l and 1 of 20 flutes, 30a–30t, thus defining a total of 240 regions, of which 168 regions are in the TS control region 42. The ratio is substantially constant in any one of these 240 regions but the ratio will be different in various regions. For example, the ratio will be lower in a relatively high pressure region (such as region 44a of flute 30t) than a relatively low pressure area (such as region 44l of flute 30t).

As noted above, in the cross flow control region 40, the stringers 28 are generally parallel to the isobars and thus for flutes 1–5 (30a–30e) variation in flute volume can be used to accommodate the distribution of external air pressure. For this reason, the ratio in all regions of flutes 30a–30e, according to one embodiment of the invention, is substantially constant.

Figure 4:
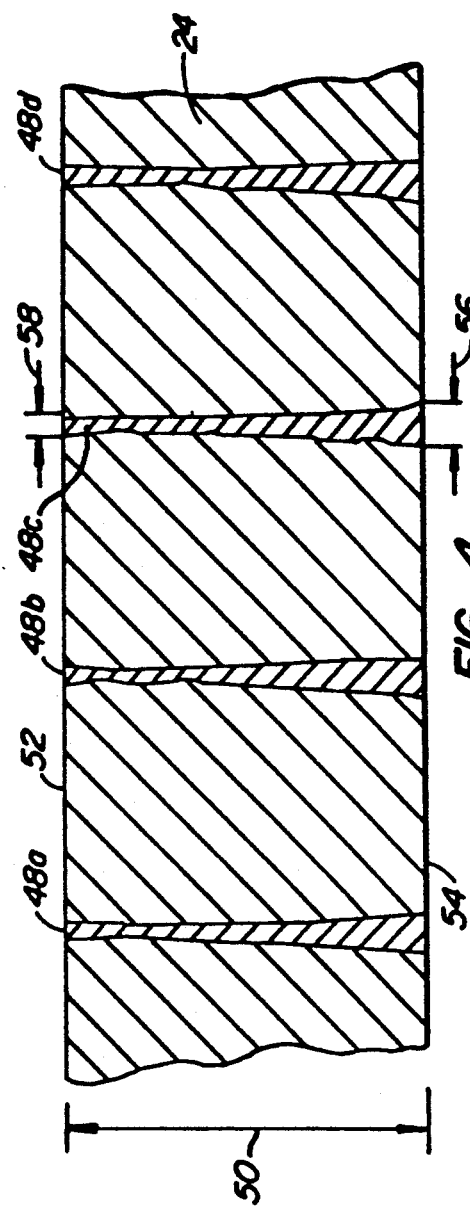
FIG. 4 is a cross-section through a portion of the wing and outer skin, showing perforations therethrough.

As seen in FIG. 4, the perforations 48a, 48b, 48c, 48d extend through the thickness 50 of the skin 24 to provide fluid communication between the upper surface 52 of the skin and the lower surface of the skin 54 of the skin. In one embodiment of the invention, the perforations 48 are tapered from the lower surface 54 to the upper surface 52. Thus, although the perforations 48 do not have precisely conical sidewalls, there is a general decrease in diameter from the diameter 56 at the lower surface 54 to the diameter 58 at the upper surface 52. Of course, the diameters precisely at the surfaces 52, 54 may be somewhat distorted by fabrication processes and the like and thus may not be representative of the size of the perforation in the region of the skin near the upper surface 52 and lower surface 54. By "near" is meant a region close enough to the surfaces that measurements will be representative of the average taper of the perforations 48. For purposes of the following discussion, "near" will be taken to mean within a distance of approximately 1/10th of the thickness 50 of the skin 24. Thus, one can define a representative upper diameter as the diameter of a cylinder, having a length equal to 1/10 of the skin depth 50 and having a volume equal to that portion of the volume of the perforation 48 which extends from the upper surface 52 a distance equal to 1/10th of the skin thickness 50. Similarly, the representative lower diameter is the diameter of a cylinder having a length equal to 1/10th of the skin thickness 50 and having a volume equal to the volume of that portion of the perforation 48 extending from the lower surface 54 a distance equal to 1/10th of the skin thickness 50. It should be understood that the figure of 1/10th is used as a matter of convenience for the following discussion and that a figure needed to provide analysis which is representative of the actual average taper of perforations may differ from 1/10th, depending on the configuration of the sidewalls of the perforations. The taper angle of the perforation can be defined as:

$$\theta = \operatorname{Arctan}\,[(D-d)/2T] \quad (1)$$

where:

D is the representative diameter of the perforation at the lower surface 54, d is the representative diameter of the perforation at the upper surface 52, T is the thickness 50 and $\Gamma$ is the taper angle of the perforation.

Preferably, the taper angle is less than 10°, more preferably less than 5° and even more preferably less than 2°.

Figure 5:
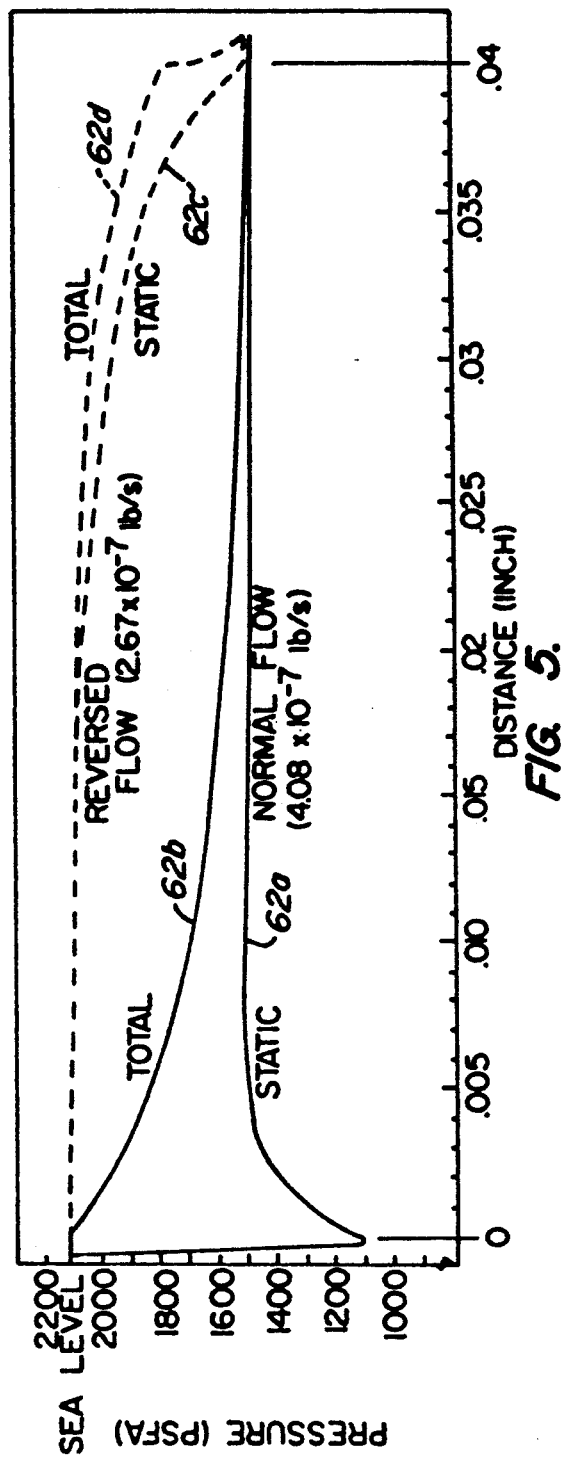
FIG. 5 is a graph showing the total and static pressure for normal flow and reversed flow along a perforation through the wing skin.

Providing perforations in a tapered configuration provides the benefit that debris at the upper surface 52 is less likely to become lodged in a perforation that has a relatively small upper surface diameter 58. Additionally, it has been found that, with sufficiently small holes, a diffuser effect occurs in holes that have a slight taper such as those depicted. As air travels along the taper, the flow is "attached" to the wall. The static pressure rises in the normal flow direction and falls in the reverse flow direction. This is depicted in FIG. 5 showing static and total pressures for normal flow 62a, 62b, and for reverse flow 62c, 62d for various distances along the perforation. FIG. 5 shows the forward and reverse flow rates that will result from a given pressure drop through a tapered hole. This results in less flow resistance in the suction direction, and provides the advantage of making it less likely that outflow can occur in response to low external pressures. The presence of taper in the perforations, however, makes it more difficult to predict the flow through the perforations since the calculations involved in computing flow through a tapered perforation are more complicated.

According to one embodiment, the method used in fabricating the LFC apparatus begins with determining external air pressure distribution. A number of techniques can be used for determining pressure distribution over a surface in fluid flow, including numerical simulations, wind tunnel measurements and in situ measurements. In many instances the pressure distribution will vary depending upon factors such as speed of travel, direction of travel with respect to ambient velocity of the fluid and ambient fluid pressure (typically a function of altitude).

Next, calculations are done to determine how much fluid flow through the surface is desired. This is typically in terms of the rate of mass transfer per unit area, per unit time. As noted above, in most situations, it is desired that this mass flow rate be uniform over large expanses of the surface despite the presence of external pressure variations. The desired mass flow rate can be based on theoretical calculations, numerical simulations, field measurements, and the like, in a manner well-known in the art. Next, it is determined what will be the pressure supplied to the lower surface of the skin 24, i.e., what will be the pressure in the plenum that provides the suction for drawing fluid through the skin 24. This figure is related to the capabilities of the pump 38 and the sizes and shapes of the flutes 30, collectors 32, and collector tubes 36 which can be provided while still leaving room for other components normally provided in the wings such as control devices, electrical and communication lines, fuel lines, fuel tanks, and the like.

Once it is known what is the desired mass flow rate, what is the pressure on the lower surface and what is the pressure on the upper surface, the ratio of effective perforation area to the skin area can be calculated so as to produce the desired mass flow rate. According to one embodiment, perforations in the cross-flow control region 40 all have effective diameters of 0.0016 inches (0.041 mm) with uniform center-to-center spacing of 0.01 inches (0.25 mm) and perforations in the TS control region 42 are provided with effective diameters of 0.0023 inches (0.058 mm) and with interperforation spacing which varies as a function of external pressure according to the following relationship:

$$\delta = 12\{[CP_{ext}(\Delta P)^b]/[\gamma_\infty u_\infty Cq_{local}]\}^{\frac{1}{2}} \quad (2)$$

where:

$\delta$ is the center-to-center perforation spacing for a rectilinear grid of perforations, in inches C is a parameter;
$C = 2.54 \times 10^{-12}$ if $\Delta P > 26$ PSF (1.2 kPa)
$C = 4.23 \times 10^{-12}$ if $\Delta P > 26$ PSF (1.2 kPa)

b is a parameter;
$b = 0.988$ if $\Delta P < 26$ PSF (1.2 kPa)
$b = 0.8098$ if $\Delta P > 26$ PSF (1.2 kPa)

Values for C and b assume an effective hole diameter of 0.0023 inches.

$P_{ext}$ is external pressure in pounds per square foot (PSF).

$\Delta P$ is the pressure drop from the upper surface to the lower surface.

$\gamma_\infty$ is weight density of air in pounds ft$^{-3}$; $\gamma_\infty = 0.01977$.

$u_\infty$ is the aircraft speed in feet per second (taken to be 774.8 FPS; 236 m. sec$^{-1}$).

$Cq_{local} =$ is the local suction constant.

This determination is made for each of the 168 regions of the TS control region 42. The results for one such calculation are depicted in Table I. Rows 30a-30f show the constant spacing which is preferably used in the cross-flow control region 40 where the perforation diameter at the upper surface of the skin 24 is 0.0016 inches (0.041 mm). Rows 30g-30t show the spatially-variable perforation spacing used in the TS control region 40 where the effective perforation diameter is 0.0023 inches (0.058 mm).

TABLE I

Perforation Spacing (Inches)
Spanwise Region Number

| Flute No. | ← Inboard | | | | | | Outboard → | | | | | |
|---|---|---|---|---|---|---|---|---|---|---|---|---|
| | 44a | 44b | 44c | 44d | 44e | 44f | 44g | 44h | 44i | 44j | 44k | 44l |
| 30a | 0.010 | 0.010 | 0.010 | 0.010 | 0.010 | 0.010 | 0.010 | 0.010 | 0.010 | 0.010 | 0.010 | 0.010 |
| 30b | 0.010 | 0.010 | 0.010 | 0.010 | 0.010 | 0.010 | 0.010 | 0.010 | 0.010 | 0.010 | 0.010 | 0.010 |
| 30c | 0.010 | 0.010 | 0.010 | 0.010 | 0.010 | 0.010 | 0.010 | 0.010 | 0.010 | 0.010 | 0.010 | 0.010 |
| 30d | 0.010 | 0.010 | 0.010 | 0.010 | 0.010 | 0.010 | 0.010 | 0.010 | 0.010 | 0.010 | 0.010 | 0.010 |
| 30e | 0.010 | 0.010 | 0.010 | 0.010 | 0.010 | 0.010 | 0.010 | 0.010 | 0.010 | 0.010 | 0.010 | 0.010 |
| 30f | 0.010 | 0.010 | 0.010 | 0.010 | 0.010 | 0.010 | 0.010 | 0.010 | 0.010 | 0.010 | 0.010 | 0.010 |
| 30g | 0.019 | 0.019 | 0.019 | 0.019 | 0.019 | 0.019 | 0.019 | 0.019 | 0.019 | 0.019 | 0.019 | 0.019 |
| 30h | 0.025 | 0.025 | 0.023 | 0.023 | 0.023 | 0.021 | 0.021 | 0.021 | 0.019 | 0.019 | 0.019 | 0.019 |
| 30i | 0.029 | 0.027 | 0.025 | 0.025 | 0.025 | 0.023 | 0.023 | 0.021 | 0.021 | 0.019 | 0.019 | 0.019 |
| 30j | 0.029 | 0.029 | 0.027 | 0.025 | 0.025 | 0.023 | 0.021 | 0.021 | 0.019 | 0.019 | 0.019 | 0.017 |
| 30k | 0.029 | 0.027 | 0.027 | 0.025 | 0.023 | 0.021 | 0.021 | 0.019 | 0.017 | 0.017 | 0.015 | 0.015 |
| 30l | 0.029 | 0.027 | 0.025 | 0.025 | 0.023 | 0.021 | 0.021 | 0.019 | 0.017 | 0.017 | 0.015 | 0.015 |
| 30m | 0.029 | 0.027 | 0.025 | 0.025 | 0.023 | 0.023 | 0.021 | 0.019 | 0.019 | 0.017 | 0.015 | 0.015 |
| 30n | 0.029 | 0.027 | 0.025 | 0.025 | 0.023 | 0.023 | 0.021 | 0.021 | 0.019 | 0.017 | 0.015 | 0.015 |
| 30o | 0.029 | 0.027 | 0.025 | 0.025 | 0.023 | 0.023 | 0.023 | 0.021 | 0.021 | 0.019 | 0.017 | 0.015 |
| 30p | 0.027 | 0.027 | 0.025 | 0.025 | 0.023 | 0.023 | 0.023 | 0.021 | 0.021 | 0.019 | 0.017 | 0.015 |
| 30q | 0.027 | 0.027 | 0.025 | 0.025 | 0.023 | 0.023 | 0.023 | 0.021 | 0.021 | 0.019 | 0.019 | 0.017 |
| 30r | 0.027 | 0.027 | 0.025 | 0.025 | 0.023 | 0.023 | 0.023 | 0.021 | 0.021 | 0.019 | 0.019 | 0.017 |
| 30s | 0.027 | 0.027 | 0.025 | 0.025 | 0.023 | 0.023 | 0.023 | 0.021 | 0.021 | 0.019 | 0.019 | 0.017 |
| 30t | 0.027 | 0.025 | 0.025 | 0.025 | 0.023 | 0.023 | 0.023 | 0.021 | 0.021 | 0.019 | 0.019 | 0.019 |

Next, a skin having the requiring perforation pattern, such as that depicted in Table I, is fabricated by perforating using a laser beam. One method of achieving the perforation involves bonding a titanium skin to a plastic sheet which is in turn bonded to a steel backing. Titanium is used because the low thermal conductivity of titanium reduces unwanted enlargement of the hole. Titanium is, however, difficult to mate with other components of the aircraft, which are typically aluminum and have a different coefficient of expansion from that of titanium. A laser beam is directed at the position where a perforation is desired. After penetrating the titanium, the beam vaporizes the plastic backing which expels a high velocity jet of vaporized plastic expelling molten titanium and leaving the desired perforation. The plastic and steel backing are removed and the titanium skin is formed into the desired shape and attached to stringers to provide the configuration depicted in FIG. 2.

Figure 6:
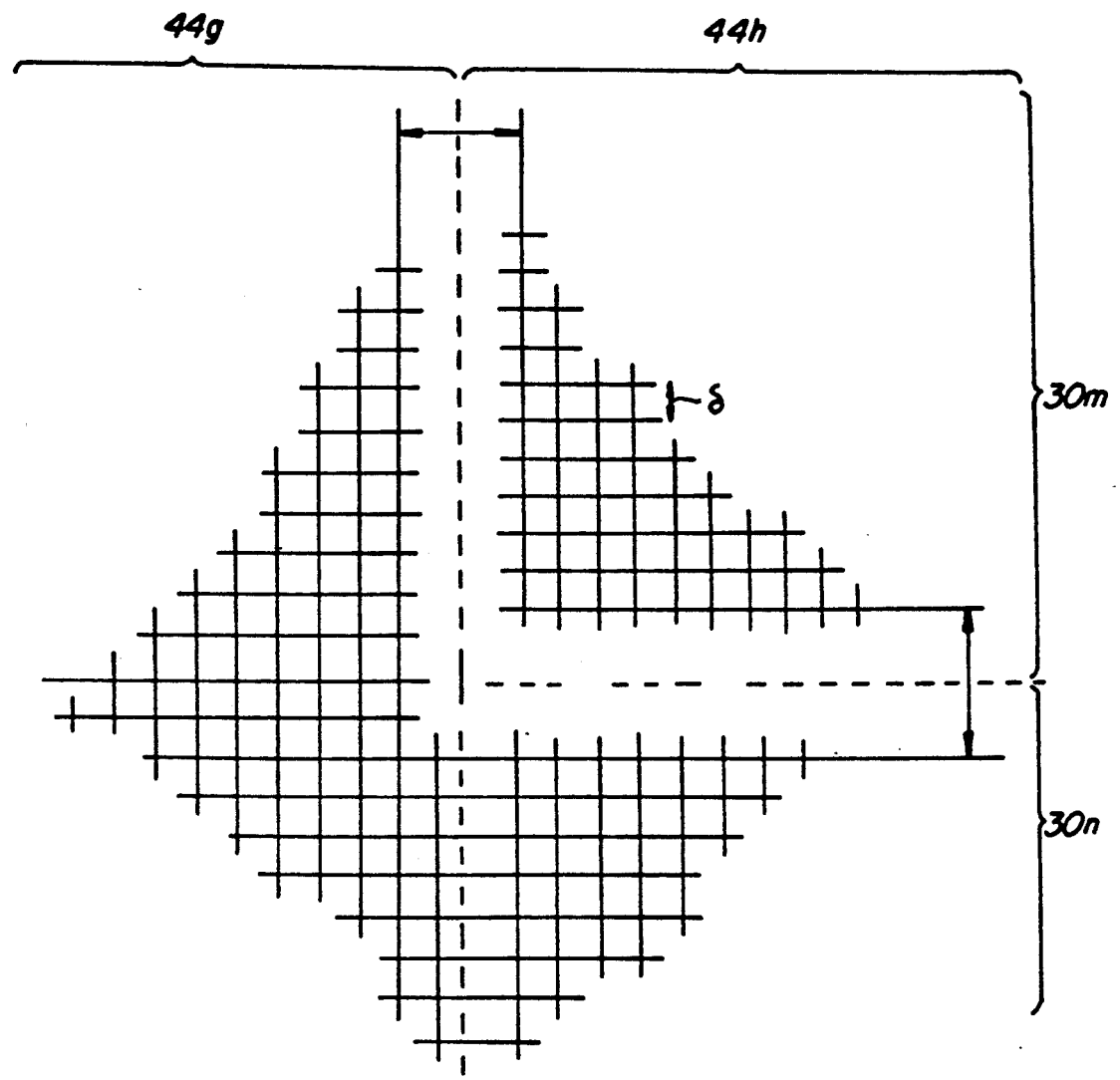
FIG. 6 is a diagram showing the location of perforations in a portion of the wing skin.

The perforations are, in one embodiment, positioned in a rectilinear grid. The grid spacing will differ in different regions of the skin, as described above. In one embodiment, a small, non-perforated region is located on edges between regions which have dissimilar spacing to make fabrication of the skin easier. This is depicted in FIG. 6, in which the intersection of solid lines indicates the location of a perforation.

In use, the laminar flow control apparatus 18 is positioned along the leading edge of an aircraft wing, as depicted in FIG. 1. The apparatus will typically not be operated during take-off and landing and a Kreuger flap will preferably be deployed at altitudes of around 5,000 ft. AGL or less, to protect the perforations from contamination by insect impact. At the desired altitude, preferably cruising altitude, such as around 39,000 ft. (about 12,000 meters) the LFC apparatus will be used. The pump 38 is used to provide a desired pressure in the plenum, such as a pressure of around 240 psf (11.5 kPa) in the flutes $30g-30t$. The pressures in all of the flutes in the TC control area 42 will be approximately the same. The amount of pressure provided to these flutes will vary depending upon the expected external pressure, typically being a function of altitude and air speed. Preferably, the perforations 48 are periodically purged by expelling hot air outward through the perforations to prevent the plugging of perforations with ice. Although the LFC apparatus will typically be designed for optimal performance during specified flight conditions, such as during cruising flight, it is believed that some laminar flow benefit can be obtained during other flight conditions such as climbing or descent, particularly if appropriate changes are made to the flute pressure. When the external pressure on the wing makes it no longer useful to employ the LFC apparatus, or when the Kreuger flap is deployed, suction is discontinued.

Figure 7:
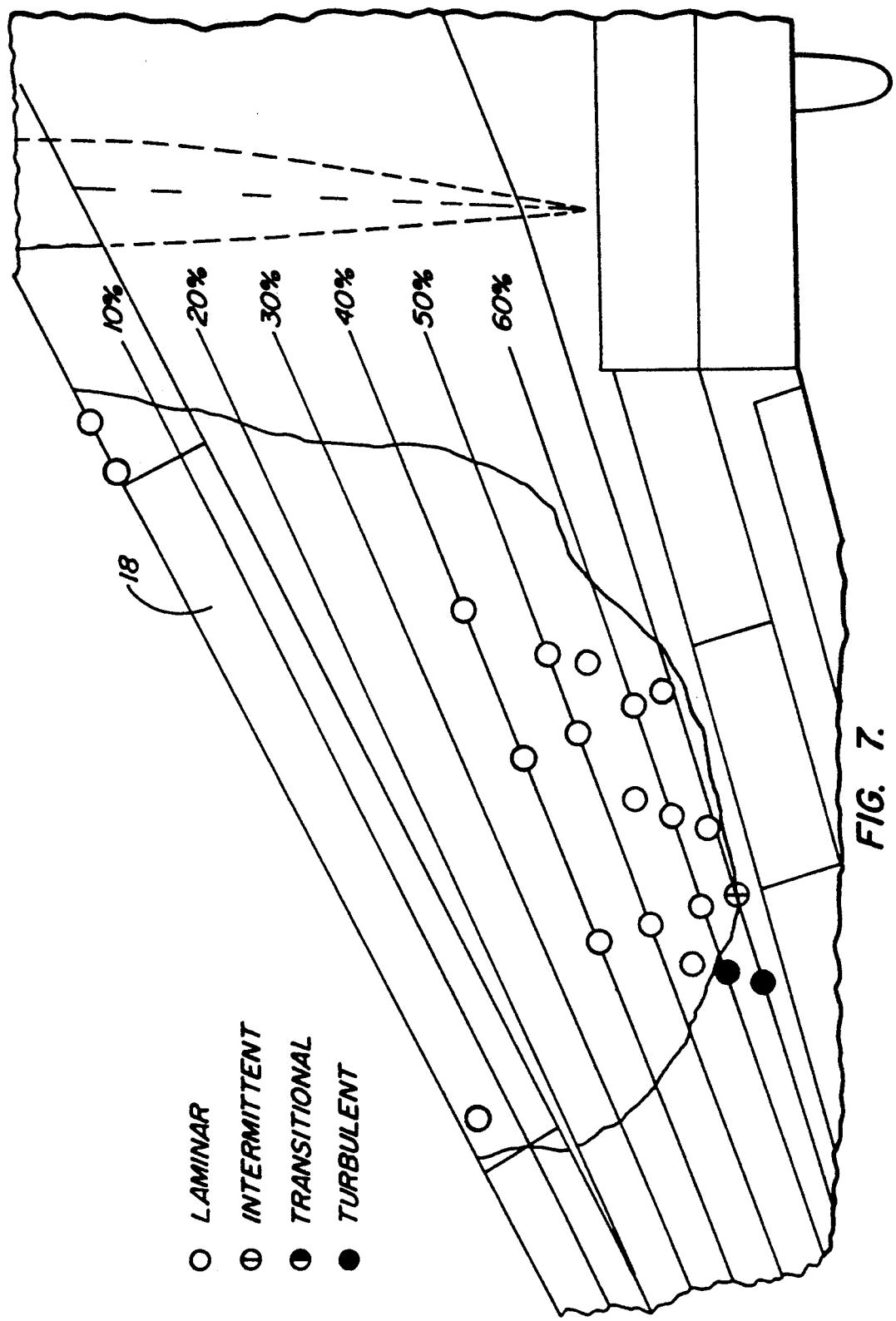
FIG. 7 is a top plan view of a portion of an aircraft wing showing the parts of the wing subjected to substantially laminar flow.

FIG. 7 depicts the results from an instrumented flight test of an LFC apparatus of the type described. As can be seen from FIG. 7, laminar flow was found to cover approximately 65% of the chordal distance to the trailing edge.

In light of the above description, a number of advantages of the present invention can be seen. Drag on a body in fluid flow, such as an aircraft in flight, can be reduced by delaying (i.e., moving aftward) the onset of turbulence. A perforated skin used in LFC apparatus can be provided which has only a small ratio of removed material to skin surface and thus remains relatively strong, avoiding the need for compensatory reinforcing material. The LFC apparatus provides relatively easy suction control since a single plenum area is used which can be provided with a single suction pressure without the need for controlling the suction provided to different regions of the skin. The perforations are sufficiently small and sufficiently close that aerodynamic roughness is reduced. Aerodynamic roughness which is typically characteristic of porous materials is avoided. The mass transfer characteristics of the perforated skin can be calculated, determined and controlled since the flow passages are fabricated rather than inherent to the material. Tapering of the perforations avoids inspiration of debris and unwanted outflow. By varying the spatial distribution of the ratio of perforation area to skin area, the variation and external pressure can be accommodated without having to use a porous material and without having to provide different suction to each different region of the skin.

A number of variations and modifications of the present invention can also be used. It is possible to use certain aspects of the invention without using other aspects. For example, it is possible to provide a spatially varying ratio without providing tapered perforations. It is possible to provide spatial variation of the ratio over the entire LFC skin without providing a region of substantially constant ratio. It is possible to provide a perforated skin in which the perforations are formed by means other than laser means. The variation in ratio can be a substantially continuous variation rather than a zone-by-zone variation. If zonal variation is used, more or fewer zones can be provided. The disclosed LFC apparatus can be used on surfaces other than a wing surface including tail rudders, elevons, and the fuselage, and can be used on non-fixed wing structures. The laminar flow control apparatus can be used on devices other than aircraft, such as watercraft, and land vehicles, and can be used on a variety of types of aircraft such as supersonic, as well as subsonic, and transatmospheric launch and re-entry vehicles.

Although the present invention has been described by way of a preferred embodiment and certain variations and modifications, other variations and modifications can also be used, the invention being defined in the following claims.

What is claimed is:

1. A laminar flow control airfoil, said airfoil having at least a first region and a second region, with said first region being subject, during flight, to an external air pressure greater than the external air pressure on said second region, the airfoil comprising:
   an outer skin having an upper skin surface and a lower skin surface with a plurality of unelongated perforations through said skin, each of said perforations having an effective cross-sectional area, to define an average ratio of effective unelongated perforation area to skin area for any region of said skin;
   a suction system coupled to deliver suction to said lower surface of said skin wherein said suction system draws air through said perforations in a direction from said upper surface toward said lower surface without said air passing through a porous material after passing through said perforations and before entering said suction system;
   said average ratio of effective perforation area to skin area being spatially varied in both spanwise and chordwise directions.

2. A laminar flow control airfoil, as claimed in claim 1, wherein said ratio is higher in at least a portion of said first region than in said second region.

3. A laminar flow control airfoil, as claimed in claim 1, wherein said ratio is spatially varied so as to produce a substantially spatially constant air flow rate through the perforated region of said skin in response to a substantially spatially constant-pressure suction applied to said perforated region by said suction system.

4. A laminar flow control airfoil, as claimed in claim 1, wherein said perforations have an effective diameter of less than about 0.005 inches.

5. A laminar flow control airfoil, as claimed in claim 1, wherein said airfoil comprises at least a portion of the wing of an aircraft.

6. A laminar flow control airfoil, as claimed in claim 5, wherein said wing has at least one engine mounted thereon.

7. A laminar flow control airfoil, as claimed in claim 1, wherein said ratio, averaged over the surface which is connected to said suction system, is less than about 0.01.

8. A laminar flow control airfoil, as claimed in claim 1, wherein said ratio, averaged over the surface which is connected to said suction system, is less than about 0.005.

9. A laminar flow control airfoil comprising:
an outer skin having an upper skin surface and a lower skin surface with a plurality of perforations through said skin, said perforations being unelongated in the cross-flow direction, each of said perforations having an effective cross-sectional area, to define an average ratio of effective unelongated perforation area to skin area for any region of said skin;
a suction system coupled to deliver suction to said lower surface of said skin wherein said suction system draws air through said perforations in a direction from said upper surface toward said lower surface; and
said ratio of perforation area to skin area being spatially varied over a first region of said skin in both spanwise and chordwise directions and being substantially constant over a second region of said skin.

10. An aircraft external surface apparatus usable for providing laminar flow control comprising:
a skin having an upper skin surface and a lower skin surface with a plurality of perforations through said skin, defining perforation sidewalls, each of said perforations having an effective cross-sectional area, to define an average ratio of effective perforation area to skin area for any region of said skin which is spatially varied in both spanwise and chordwise directions;
a suction system connected to said lower surface of said skin which draws air through said perforations in a direction from said upper surface toward said lower surface;
said perforation sidewalls having a substantially tapering configuration from said lower surface to said upper surface.

11. An external surface apparatus, as claimed in claim 10, wherein said ratio is spatially varied so as to produce a substantially spatially constant air flow rate through the perforated region of said skin in response to a substantially spatially constant-pressure suction applied to said perforated region by said suction system.

12. An external surface apparatus, as claimed in claim 10, wherein said perforations have a maximum effective diameter of about 0.0023 inches.

13. An external surface apparatus, as claimed in claim 10, wherein at least a portion of said external surface apparatus comprises a non-wing surface of an aircraft.

14. A method for fabrication of an airfoil, to be formed using an outer skin material, the method comprising:
determining average air pressure distribution which will occur over at least a portion of the surface of said airfoil during cruising:
perforating a skin material, following said step of determining, with non-uniformly positioned unelongated perforations to provide a distribution of the ratio of perforation effective area to skin area which is inversely related to said pressure distribution;
forming said perforated skin into at least said portion of a surface of an airfoil; and
coupling a suction system to deliver suction to said lower surface of said skin.

15. The method of claim 14, wherein said step of perforating comprises perforating said skin using a beam of laser light.

16. A laminar flow control airfoil, said airfoil having at least a first region, a second region and a third region, with said first region being subject, during flight, to an external air pressure greater than the external air pressure on said second region, the airfoil comprising:
an outer skin having an upper skin surface and a lower skin surface, at least some of said outer skin having a plurality of unelongated perforations through said outer skin, each of said perforations having an effective cross-sectional area, to define an average ratio of effective unelongated perforation area to skin area for any region of said outer skin;
an inner skin attached to said outer skin by a plurality of stringers to define flutes, each being bounded by said outer skin, said inner skin and said stringers;
a plurality of collectors in fluid communication with said flutes;
a plurality of collection tubes in fluid communication with said collectors;
a pump connected to said collection tubes, to provide a pressure in said flutes lower than said external pressure to draw air through said perforations in a direction from said upper surface toward said lower surface, without passing through a porous material after passing through said perforations and before leaving said flutes and entering said collectors;
said ratio of perforation area to skin area being spatially variable in said first and second regions of said airfoil wherein said ratio is higher in at least a portion of said first region than in said second region and said ratio being substantially constant over said third region of said skin;
said perforation sidewalls having a substantially tapering configuration from said lower surface to said upper surface.

17. An airfoil, as claimed in claim 16, wherein said pressure provided to said flutes adjacent at least said first and second regions is substantially spatially constant.

18. An airfoil, as claimed in claim 16, wherein said stringers in said third region are substantially aligned with isobars of said external pressure.

19. A laminar flow control airfoil, as claimed in claim 16, wherein said ratio is spatially varied so as to produce a substantially spatially constant air flow rate through at least said first and second regions of said skin in response to a substantially spatially constant-pressure suction applied to at least said first and second regions by said suction system.

20. A laminar flow control airfoil, as claimed in claim 16, wherein the taper angle of said perforations is less than about 5°.

21. A laminar flow control airfoil, as claimed in claim 16, wherein the static pressure within said perforation rises in the normal flow direction and falls in the reverse direction.

22. A laminar flow control airfoil, said airfoil having at least a first region and a second region, with said first region being subject, during flight, to an external air pressure greater than the external air pressure on said second region, the airfoil comprising:
- an outer skin having an upper skin surface and a lower skin surface;
- unelongated perforation means in said skin for permitting air flow through said skin and defining an average ratio of effective unelongated perforation area to skin area for any region of said skin;
- suction means for drawing air through said perforation means, without said air passing through a porous material after passing through said perforation means and before entering said suction means; and
- said average ratio of effective perforation area to skin area being spatially varied in both spanwise and chordwise directions.

* * * * *